United States Patent
Furuya et al.

(10) Patent No.: US 10,362,282 B2
(45) Date of Patent: Jul. 23, 2019

(54) DRIVE CIRCUIT AND IMAGE PROJECTION APPARATUS

(71) Applicant: FUJITSU LIMITED, Kawasaki-shi, Kanagawa (JP)

(72) Inventors: Akiko Furuya, Yokohama (JP); Nobuaki Kawasoe, Yokohama (JP); Tomoki Katou, Kawasaki (JP); Hiromi Fukino, Kawasaki (JP); Yusuke Ujiie, Kawasaki (JP); Shuhei Hatae, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/910,034

(22) Filed: Mar. 2, 2018

(65) Prior Publication Data
US 2018/0288377 A1 Oct. 4, 2018

(30) Foreign Application Priority Data
Mar. 28, 2017 (JP) .................................. 2017-062349

(51) Int. Cl.
*H04N 9/31* (2006.01)

(52) U.S. Cl.
CPC ......... *H04N 9/3155* (2013.01); *H04N 9/3161* (2013.01); *H04N 9/3164* (2013.01); *H04N 9/3194* (2013.01)

(58) Field of Classification Search
CPC .. H04N 9/3155; H01S 5/0683; H01S 5/06812
See application file for complete search history.

(56) References Cited

U.S. PATENT DOCUMENTS

| 5,640,473 A * | 6/1997 | Wheeler | G02B 6/4203 |
| | | | 372/24 |
| 5,966,395 A * | 10/1999 | Ikeda | H01S 5/06832 |
| | | | 372/31 |
| 2005/0187446 A1* | 8/2005 | Nordstrom | A61B 5/14551 |
| | | | 600/323 |

(Continued)

FOREIGN PATENT DOCUMENTS

| JP | 2010-107615 | 5/2010 |
| JP | 2010-175671 | 8/2010 |
| JP | 2011-039324 | 2/2011 |

*Primary Examiner* — Paulos M Natnael
(74) *Attorney, Agent, or Firm* — Fujitsu Patent Center

(57) ABSTRACT

A drive circuit for supplying a drive current to light emitting elements includes an output circuit that sets a magnitude of the drive current based on an assumed value of a threshold current being a threshold value of the drive current, an acquisition circuit that acquires an optical-output monitor value indicating a magnitude of an optical output of the light emitting elements, a first calculation circuit that calculates an average value of the drive current in a predetermined period in a frame period as an average drive current value for each of the predetermined period, a second calculation circuit that calculates an average value of the optical-output monitor values in the predetermined period as an average optical-output monitor value, and an adjustment circuit that adjusts the assumed value of the threshold current value based on the average drive current value and the average optical-output monitor value.

17 Claims, 12 Drawing Sheets

(56) References Cited

U.S. PATENT DOCUMENTS

| | | | |
|---|---|---|---|
| 2011/0205535 A1* | 8/2011 | Soller | A61B 5/14552 356/300 |
| 2012/0049858 A1* | 3/2012 | Hiraki | H03K 7/08 324/555 |
| 2012/0176565 A1* | 7/2012 | Yu | G09G 3/3406 349/62 |

* cited by examiner

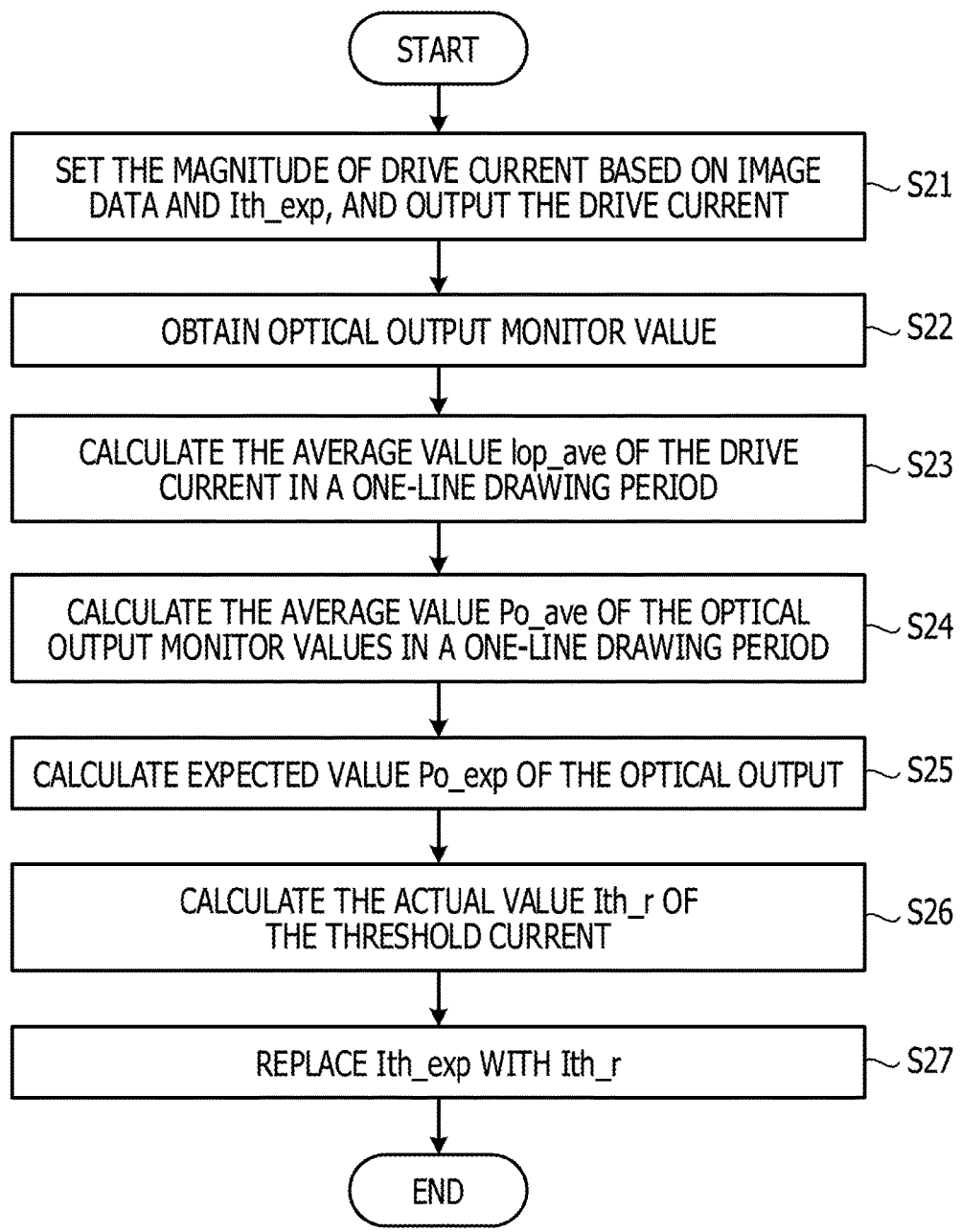

DRIVE CIRCUIT AND IMAGE PROJECTION APPARATUS

CROSS-REFERENCE TO RELATED APPLICATION

This application is based upon and claims the benefit of priority of the prior Japanese Patent Application No. 2017-62349, filed on Mar. 28, 2017, the entire contents of which are incorporated herein by reference.

FIELD

The embodiments discussed herein are related to a drive circuit and an image projection apparatus.

BACKGROUND

As a technique regarding an image projection apparatus that shifts the irradiation position of light emitted from a light emitting element by a movable mirror in sequence so as to draw an image on a display screen, the following techniques are known.

For example, an image projection apparatus is known that includes a plurality of light sources, a light scanning unit that scans a projection surface with light emitted from each of the light sources, a light detector that receives light from each of the light sources, and a control circuit that controls the plurality of light sources based on the output signal from the light detector and a video signal. The control circuit causes each of the light sources to emit light in one pixel section in a time division and to adjust the light emission intensity based on the output signal from a light detector in a light emission section of each of the light sources.

Also, an image projection apparatus is known that includes a light detection unit that detects the amount of light beams emitted from a light source, a light deflection unit that scans a projection surface with light beams reflected by a light reflection unit, a light-source output control unit that determines a drive current supplied to the light source, and an image processing unit that controls the light-source output control unit. The light-source output control unit corrects the drive current supplied to the light source such that the difference between the amount of light based on image information and the amount of light beams actually emitted based on the amount of light detected by the light detection unit. The image processing unit controls the light-source output control unit so as to replace a part of the drawing beams projected for drawing an image with control beams used for correcting the drive current.

A laser projector is known that includes a laser light source and a scanning unit that performs scanning with the laser light emitted from the laser light source, and that gives a drive current in accordance with an input image signal to the laser light source so as to cause the laser light source to emit laser light in order to project an image on a projection area. In the case where a first pixel and a second pixel are adjacent in the right and left direction, a drive current is changed to a threshold current value in a period of projecting a specific pixel such that the optical output of the laser light source becomes a predetermined magnitude at least at the end of the period of projecting the specific pixel, which is a first pixel.

The followings are reference documents.
[Document 1] Japanese Laid-open Patent Publication No. 2010-107615,
[Document 2] Japanese Laid-open Patent Publication No. 2010-175671, and
[Document 3] Japanese Laid-open Patent Publication No. 2011-39324.

SUMMARY

According to an aspect of the invention, a drive circuit for supplying a drive current to light emitting elements includes an output circuit that sets a magnitude of the drive current based on an assumed value of a threshold current being a threshold value of the drive current, an acquisition circuit that acquires an optical-output monitor value indicating a magnitude of an optical output of the light emitting elements, a first calculation circuit that calculates an average value of the drive current in a predetermined period in a frame period when an image for one frame is drawn as an average drive current value for each of the predetermined period, a second calculation circuit that calculates an average value of the optical-output monitor values in the predetermined period as an average optical-output monitor value, and an adjustment circuit that adjusts the assumed value of the threshold current value based on the average drive current value and the average optical-output monitor value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 is a flowchart illustrating a flow of adjustment processing performed by the drive circuit according to the other embodiment.

DESCRIPTION OF EMBODIMENTS

Figure 1:
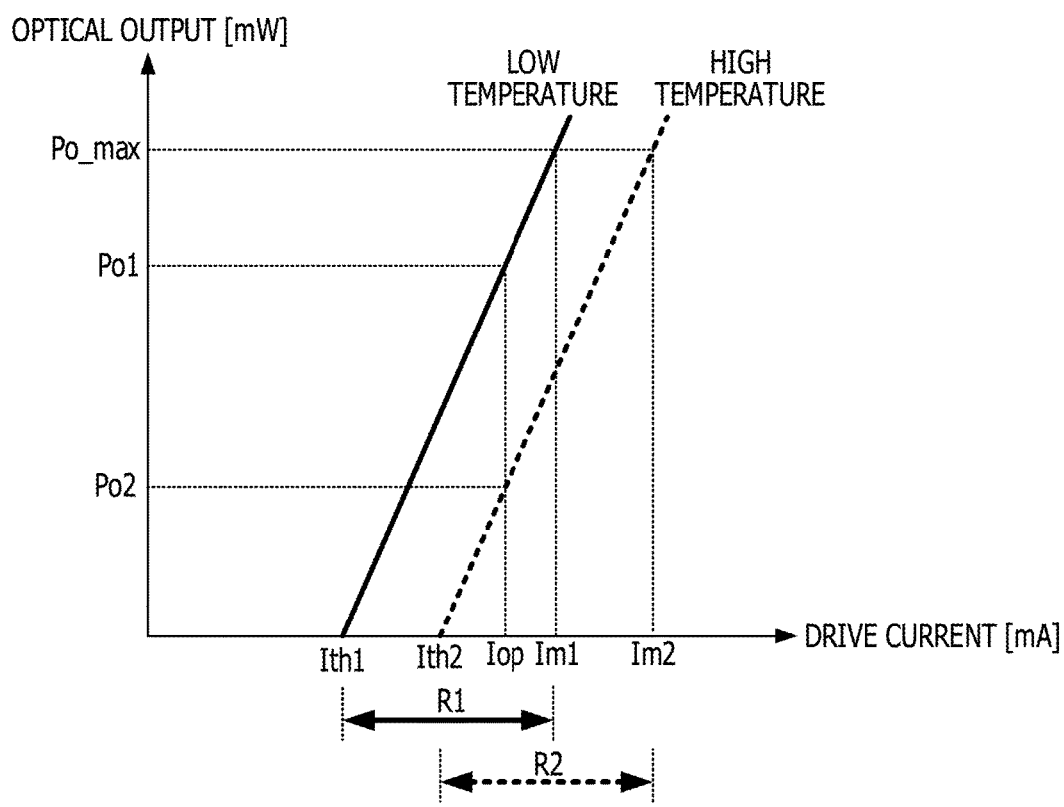
FIG. 1 is a graph illustrating an example of a relationship between drive current of a laser diode and optical output.

FIG. 1 is a graph illustrating an example of a relationship between drive current of a laser diode, which is used as a light emitting element used for an image projection apparatus, and optical output.

In order to cause a laser diode to emit light, a drive current higher than a threshold current value, which is a threshold value of a drive current for the laser diode to start light emission, has to be supplied to the laser diode. That is to say, even if a drive current lower than the threshold current value is supplied, the optical output of the laser diode is zero. On the other hand, in the area of a drive current higher than a threshold current value, the magnitude of an optical output linearly increases to an increase of the drive current.

Also, the threshold current value of a laser diode changes in accordance with the ambient temperature. In general, as illustrated in FIG. 1, a threshold current value Ith2 at high temperature is higher than a threshold current value Ith1 at low temperature. Accordingly, in an image projection apparatus including a laser diode, an assumed value of the threshold current value is set for the light emitting element, and the magnitude of a drive current is set based on the set assumed value of the threshold current value.

For example, if the assumed value of the threshold current value is set to Ith1, the output range of the drive current at the time of drawing an image becomes a range R1 from Ith1 to Im1. On the other hand, if the assumed value of the threshold current value is set to Ith2, the output range of the drive current at the time of drawing an image becomes a range R2 from Ith2 to Im2. Here, Im1 and Im2 are drive currents that are demanded for obtaining the maximum optical outputs Po_max corresponding to the maximum luminance of the display image respectively.

For example, when a laser diode is driven by certain drive current Iop, the magnitude of the optical output at low temperature becomes Pot1, whereas the magnitude of the optical output at high temperature becomes Pot2, which is lower than Po1. That is to say, when the same drive current is supplied to a laser diode, the optical output of the laser diode changes depending on the ambient temperature.

The threshold current value of a laser diode has a temperature characteristic as described above, and thus an assumed value of the threshold current value sometimes deviates from an actual value. In this case, the magnitude of optical output becomes excessively small or large with respect to an expected value. As a method for solving this problem, for example, the following method is considered.

The image projection apparatus includes a movable mirror that moves the irradiation position of a beam emitted from a laser diode on a screen so as to draw an image on the screen. The movable mirror changes the angular position of a reflective surface in sequence so as to shift the irradiation position of a beam incident on the reflective surface along a drawing line on the screen. The movable mirror changes the angular position of the reflective surface so as to draw each line while shifting an image for one line in the direction crossing the direction of the drawing line in order to draw an image for one frame.

Such an image projection apparatus controls the angular position of the reflective surface of the movable mirror such that the laser irradiation position is positioned outside the screen in an inter-frame blanking period.

Next, an assumed value Ith_exp of the threshold current value is determined, and a drive current Iop_max having the magnitude corresponding to a maximum optical output Po_max is supplied to the laser diode based on the assumed value Ith_exp of the threshold current value.

Next, an optical-output monitor value Po_mon that has been produced by monitoring the optical output of the laser diode emitting light in accordance with the drive current Iop_max is obtained, and the optical-output monitor value Po_mon and the maximum optical output Po_max are compared.

If the optical-output monitor value Po_mon is lower than the maximum optical output Po_max, the assumed value Ith_exp of the threshold current value set for the laser diode is increased by one step. On the other hand, if the optical-output monitor value Po_mon is higher than the maximum optical output Po_max, the assumed value Ith_exp of the threshold current value set for the laser diode is decreased by one step.

After that, the angular position of the reflective surface of the movable mirror is moved to the initial position, the magnitude of the drive current is set based on the assumed value Ith_exp of the threshold current value newly set, and an image of the next frame is drawn. By performing the above-described processing for each inter-frame blanking period, it is possible to bring the assumed value Ith_exp of the threshold current value closer to the actual value.

However, by the above-described method, a laser diode is caused to emit light in a blanking period in which an image is not displayed on a screen to obtain the optical-output monitor value Po_mon, and thus a mechanism to avoid irradiation of the light emitted from the laser diode on the screen has to be employed. In the example described above, by controlling the angular position of the reflective surface of the movable mirror, light irradiation on the screen is avoided.

However, in the case where a further increase of the number of pixels and a further increase in the frame rate are requested, it is assumed that the movable mirror has to be moved at a higher speed, and the movable range of the movable mirror has to be enlarged to the limit. In this case, it is expected that it becomes different to avoid light irradiation on the screen by controlling the angular position of the reflective surface of the movable mirror. Also, by the above-described method, in order to avoid light irradiation on the screen, the reflective surface of the movable mirror has to be largely inclined, and thus it takes a long processing time to adjust the assumed value of the threshold current value.

Also, by the above-described method, the power consumption becomes significantly large because the laser diode is driven in a blanking period in which the laser diode is originally not driven. Further, with a request for increasing the speed of the frame rate and for enlarging the movable range of the movable mirror, there is a possibility of removing an inter-frame blanking period in the future. Accordingly, it becomes difficult to cope with the situation by the above-described method of making an adjustment in an inter-frame blanking period.

In the following, a description will be given of an example of embodiments with reference to the drawings. In this regard, the same component or equivalent component and part are given the same reference signs in each of the drawings.

First Embodiment

Figure 2:
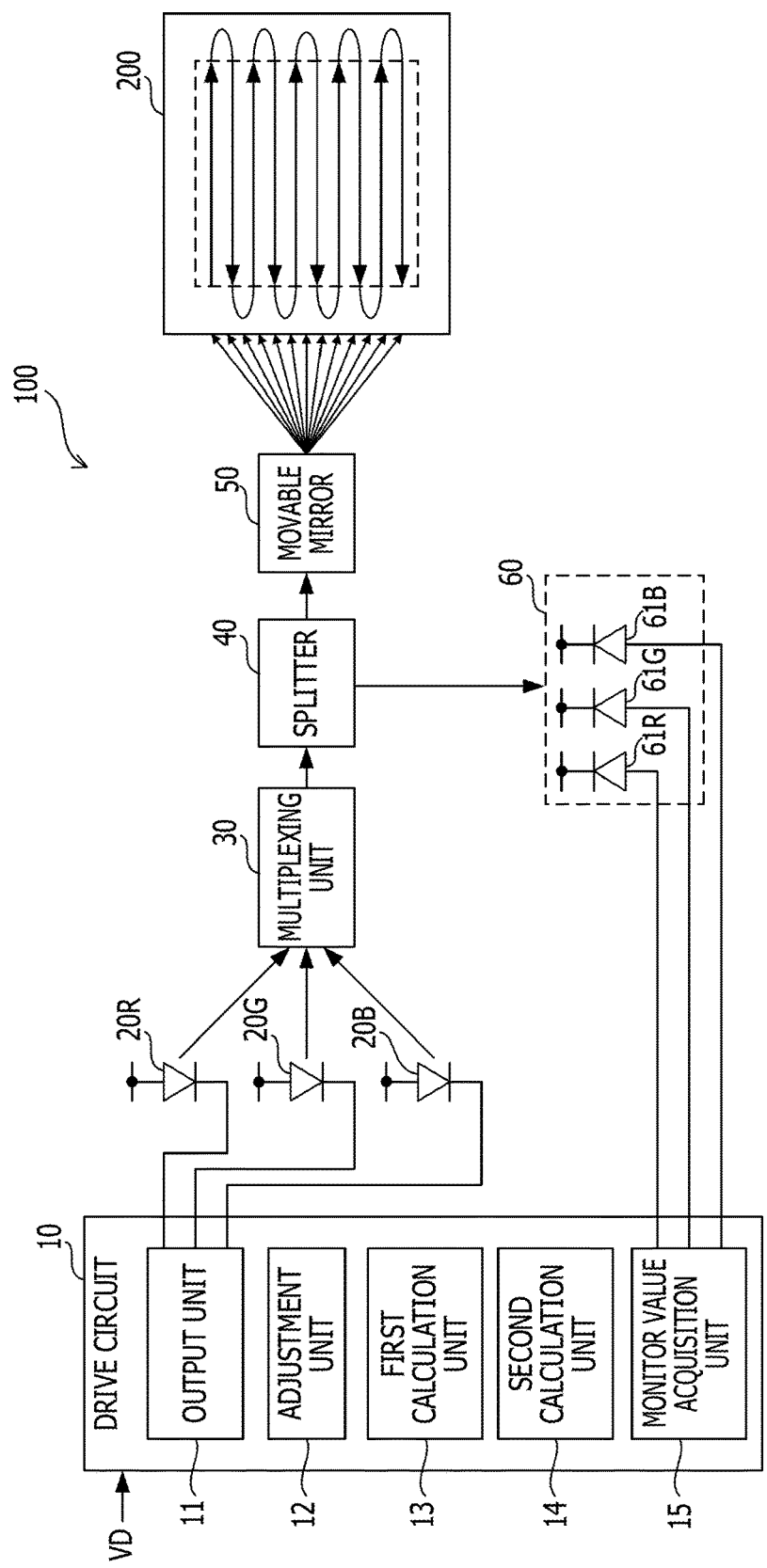
FIG. 2 is a diagram illustrating the configurations of a drive circuit according to an embodiment and an image projection apparatus including the drive circuit.

FIG. 2 is a diagram illustrating the configurations of a drive circuit 10 according to an embodiment and an image projection apparatus 100 including the drive circuit 10. The image projection apparatus 100 includes the drive circuit 10, light emitting elements 20R, 20G, and 20B, a multiplexing unit 30, a splitter 40, a movable mirror 50, and a monitoring unit 60. It is possible to apply the image projection apparatus 100, for example, to a head mounted display, a projector, and the like.

The light emitting elements 20R, 20G, and 20B are laser diodes that emit red light, green light, and blue light respectively, and emit the amount of light (optical output) in accordance with the magnitude of the drive current supplied from the drive circuit 10. The light emitting elements 20R, 20G, and 20B have individual characteristics similar to the drive current-optical output characteristic illustrated in FIG. 1, and the threshold current values for starting light emission change in accordance with the ambient temperature.

The drive circuit 10 sets the magnitudes of the drive currents based on the pixel values (RGB values) illustrated by image data VD supplied from the outside and the assumed values Ith_exp of the threshold current values set for the respective light emitting elements 20R, 20G, and 20B. The drive circuit 10 outputs drive currents from an output unit 11 to supply the drive currents to the light emitting elements 20R, 20G, and 20B. A detailed description will be later given of the drive circuit 10.

The multiplexing unit 30 multiplexes the light emitted from the light emitting elements 20R, 20G, and 20B and outputs one beam. The beam emitted from the multiplexing unit 30 is led to the splitter 40. The splitter 40 splits the beam emitted from the multiplexing unit 30 into two beams. One of the beams divided by the splitter 40 is led to the movable mirror 50, and the other of the beams is led to the monitoring unit 60.

Figure 3:
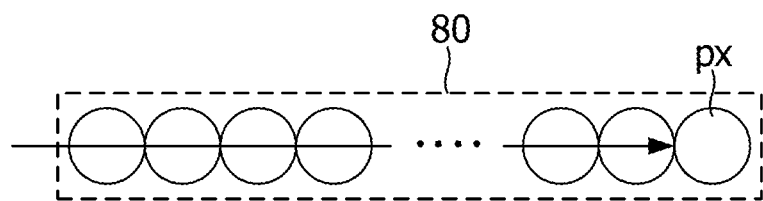
FIG. 3 is a diagram illustrating an image for one line drawn by the image projection apparatus according to the embodiment.

The movable mirror 50 shifts the irradiation position of the light emitted from each light emitting element in sequence on a screen 200 so as to function an optical system that draws each frame of an image including a plurality of frames in sequence on the screen 200. The movable mirror 50 includes, for example, a micro electro-mechanical systems (MEMS) mirror and is capable of electrically control the angular position of the reflective surface that reflects the incident light. The movable mirror 50 changes the angular position of the reflective surface so as to shift the irradiation position of the incident beam on the reflective surface in sequence along the drawing line on the screen 200. Thereby, as illustrated in FIG. 3, a beam spot that constitutes a pixel px moves along the drawing line in sequence, and an image for one line 80 is drawn on the screen 200. The movable mirror 50 changes the angular position of the reflective surface so as to draw an image of each line while shifting an image for one line 80 in the direction crossing the direction of the drawing line in sequence. Thereby, an image for one frame is drawn on the screen. That is to say, the movable mirror 50 changes the angular position of the reflective surface so as to irradiate the light emitted from the light emitting elements 20R, 20G, and 20B on the screen 200 such that the light meanders from the upper end to the lower end of the screen 200 as illustrated in FIG. 2.

The monitoring unit 60 includes photodiodes 61R, 61G, and 61B having respective sensitivities to red light, green light, and blue light. Each of the photodiodes 61R, 61G, and 61B receives one of the beams that are produced by dividing a beam emitted from a corresponding one of the light emitting elements 20R, 20G, and 20B by the splitter 40 into two beams, and outputs an optical current in accordance with the amount of received light (optical output).

The drive circuit 10 includes the output unit 11, an adjustment unit 12, a first calculation unit 13, a second calculation unit 14, and a monitor-value acquisition unit 15.

Figure 4:
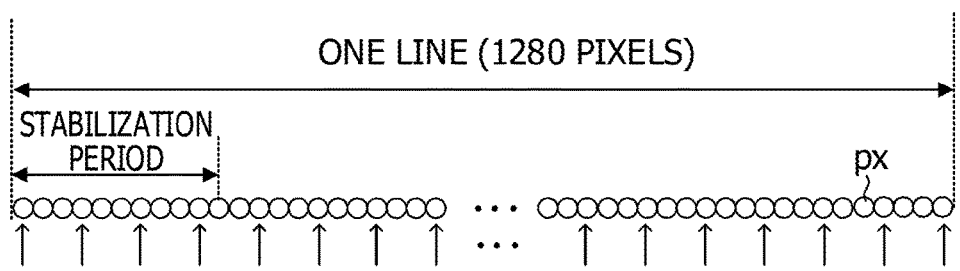
FIG. 4 is a diagram illustrating an example of a method of sampling optical current when a monitor-value acquisition unit according to the embodiment converts an optical current into a digital value.

The monitor-value acquisition unit 15 converts the optical current output from the photodiodes 61R, 61G, and 61B into digital values and obtains the digital values as optical-output monitor values. FIG. 4 is a diagram illustrating an example of a method of sampling optical current that is output from each of the photodiodes 61R, 61G, and 61B when the monitor-value acquisition unit 15 according to the embodiment converts an optical current into a digital value.

The monitor-value acquisition unit 15 performs sampling of the optical current, for example, 40 times at equal intervals in a one-line drawing period in which an image for one line is drawn. If an image for one line includes, for example, 1280 pixels, the monitor-value acquisition unit 15 samples the optical currents corresponding to 40 pixels out of the 1280 pixels in a one-line drawing period and converts each of the current into digital values to obtain optical-output monitor values. In this regard, an initial period in a one-line drawing period corresponds to a stabilization period during which an adjustment unit 12 described below adjusts the assumed value of the threshold current value and reflects the adjustment on the optical output. Accordingly, the monitor-value acquisition unit 15 may exclude the optical current in the stabilization period from the target of the sampling.

The first calculation unit 13 calculates the average value of the drive currents output from the drive circuit 10 in a one-line drawing period as an average drive current value Iop_ave for each of the light emitting elements 20R, 20G, and 20B. That is to say, if an image for one line includes, for example, 1280 pixels, the first calculation unit 13 calculates the average value of the drive currents corresponding to the respective 1280 pixels as an average drive current value Iop_ave for each light emitting element. The first calculation unit 13 calculates the average drive current value Iop_ave for each one-line drawing period (for each image for one line) for each light emitting element. In this regard, the drive circuit 10 determines the magnitude of a drive current to be supplied to each of the light emitting elements 20R, 20G, and 20B based on a corresponding one of the pixel values (RGB values) indicated by an image data VD supplied from the outside. Accordingly, it is possible for the first calculation unit 13 to calculate an average drive current value Iop_ave based on the image data VD.

The second calculation unit 14 calculates, out of the optical-output monitor values output from the monitor-value acquisition unit 15, the average value of the optical-output monitor values in a one-line drawing period for each of the light emitting elements 20R, 20G, and 20B as an average optical-output monitor value Po_ave. For example, if the monitor-value acquisition unit 15 generates 40 optical-output monitor values in a one-line drawing period for each of the light emitting elements, the second calculation unit 14 calculates the average value of the 40 optical-output monitor values as the average optical-output monitor value Po_ave for each of the light emitting elements. The second calculation unit 14 calculates the average optical-output monitor value Po_ave for each one-line drawing period (for each image for one line) for each of the light emitting elements.

The adjustment unit 12 adjusts the assumed value Ith_exp of the threshold current value set for each light emitting element based on the calculated average drive current value Iop_ave calculated by the first calculation unit 13 and the average optical-output monitor value Po_ave calculated by the second calculation unit 14. Specifically, if the average drive current value Iop_ave is higher than the threshold value Iop_low, and the average optical-output monitor value Po_ave is lower than the threshold value Po_low, the adjustment unit 12 increases the assumed value Ith_exp of the threshold current value of the light emitting element by one step. That is to say, if the average optical-output monitor value Po_ave is lower than the threshold value Po_low in the case where a drive current higher than the threshold value Iop_low is output, the adjustment unit 12 increases the assumed value Ith_exp of the threshold current value assumed for the light emitting element by one step.

Also, if the average drive current value Iop_ave is lower than the threshold value Iop_high, and the average optical-output monitor value Po_ave is higher than the threshold value Po_high, the adjustment unit 12 decreases the assumed value Ith_exp of the threshold current value of the light emitting element by one step. That is to say, if the average optical-output monitor value Po_ave is higher than the threshold value Po_high in the case where a drive current lower than the threshold value Iop_high is output, the adjustment unit 12 decreases the assumed value Ith_exp of the threshold current value of the light emitting element by one step. In this regard, it is assumed that the threshold value Iop_low, Iop_high and the Po_low, Po_high are predetermined values in advance, and the Iop_low is lower than Iop_high, and Po_low is lower than Po_high.

The output unit 11 sets the magnitude of the drive current for each of the light emitting elements 20R, 20G, and 20B based on the image data VD input from the outside and the assumed value Ith_exp of the threshold current value, and outputs the drive current having the set magnitude.

In the following, a description will be given of the operation of the image projection apparatus 100. The output unit 11 sets the assumed value Ith_exp of the threshold current value for each of the light emitting elements 20R, 20G, and 20B, and sets the magnitude of a drive current based on the assumed value Ith_exp of the threshold current value and the image data VD supplied from the outside. The output unit 11 outputs the drive current having the set magnitude.

Each of the light emitting elements 20R, 20G, and 20B emits the amount of light (optical output) in accordance with a corresponding one of the magnitude of the drive current output from the drive circuit 10. Each light emitted from the light emitting elements 20R, 20G, and 20B is multiplexed by the multiplexing unit 30, integrated into one beam, and is led to the splitter 40. The splitter 40 divides the beam emitted from the multiplexing unit 30 into two beams. One of the beams divided by the splitter 40 is led to the movable mirror 50, and the other of the beams is led to the monitoring unit 60.

The movable mirror 50 changes the angular position of the reflective surface in synchronism with changes of the optical output of the light emitting elements 20R, 20G, and 20B based on the image data. Thereby, the movable mirror 50 irradiates the light emitted from the light emitting elements 20R, 20G, and 20B on the screen 200 such that the light meanders from the upper end to the lower end on the screen 200 as illustrated in FIG. 2 in order to draw an image on the screen 200.

On the other hand, each of the photodiodes 61R, 61G, and 61B included in the monitoring unit 60 receives one of the beams divided by the splitter 40 and outputs the optical current in accordance with the amount of received light (optical output). The photodiode 61R outputs the optical current having the magnitude in accordance with the optical output of the light emitting element 20R. The photodiode 61G outputs the optical current having the magnitude in accordance with the optical output of the light emitting element 20G. The photodiode 61B outputs the optical current having the magnitude in accordance with the optical output of the light emitting element 20B.

The drive circuit 10 determines the magnitude of the drive current based on the assumed value Ith_exp of the threshold current value of each of the light emitting elements 20R, 20G, and 20B. As illustrated in FIG. 1, the threshold current value Ith changes in accordance with the ambient temperature, and thus the assumed value Ith_exp of the threshold current value sometimes deviates from the actual value. In this case, the assumed optical output is not obtained from each of the light emitting elements 20R, 20G, and 20B, and the brightness of an image drawn on the screen 200 sometimes becomes excessively high or low.

Figure 5:
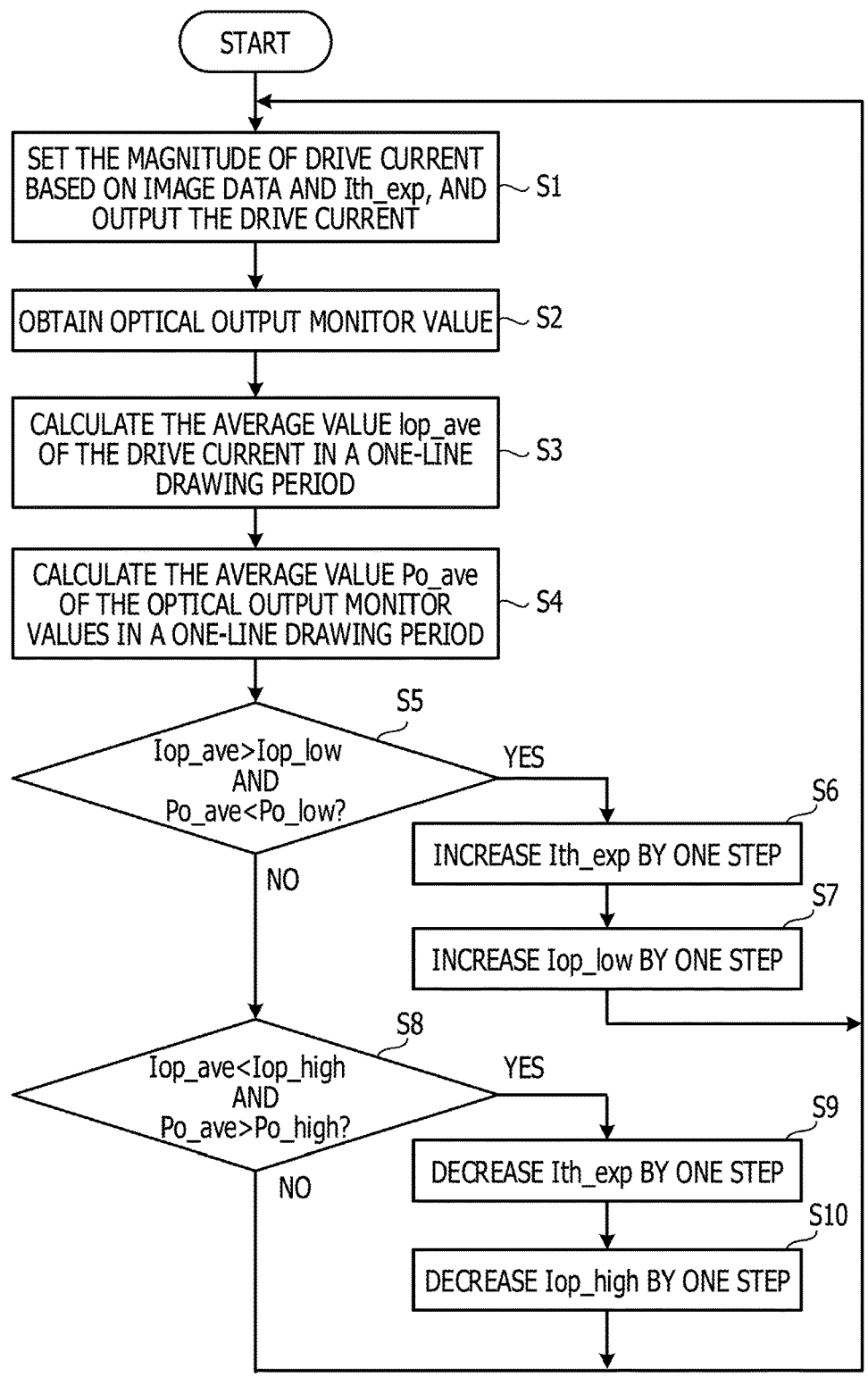
FIG. 5 is a flowchart illustrating a flow of adjustment processing performed by the drive circuit according to the embodiment.

Thus, the drive circuit 10 adjusts the assumed value Ith of the threshold current value using the optical-output monitor value as follows. FIG. 5 is a flowchart illustrating a flow of adjustment processing performed by the drive circuit 10.

In step S1, the output unit 11 sets the magnitude of the drive current for each of the light emitting elements 20R, 20G, and 20B based on the image data VD input from the outside and the assumed value Ith_exp of the threshold current value, and outputs a drive current having the set magnitude. Thereby, each of the light emitting elements 20R, 20G, and 20B emits the amount of light (optical output) in accordance with the magnitude of the drive current.

In step S2, the monitor-value acquisition unit 15 obtains each value produced by sampling the optical current output from each of the photodiodes 61R, 61G, and 61B at a predetermined sampling period and converting the optical current into a digital value as an optical-output monitor value.

In step S3, the first calculation unit 13 calculates the average drive current value Iop_ave in a one-line drawing period for each of the light emitting elements 20R, 20G, and 20B. That is to say, the first calculation unit 13 calculates the average value of the drive currents corresponding to individual pixels included in an image for one line for each light emitting element as the average drive current value Iop_ave.

In step S4, the second calculation unit 14 calculates the average value of the optical-output monitor values in a one-line drawing period among the optical-output monitor values obtained by the monitor-value acquisition unit 15 for each of the light emitting elements 20R, 20G, and 20B as the average optical-output monitor value Po_ave.

In step S5, the adjustment unit 12 determines whether or not the calculated average drive current value Iop_ave is higher than the threshold value Iop_low, and the calculated average optical-output monitor value Po_ave is lower than the threshold value Po_low. The adjustment unit 12 performs the above-described determination for each of the light emitting elements 20R, 20G, and 20B. If the adjustment unit 12 determines that the average drive current value Iop_ave is higher than the threshold value Iop_low, and the average optical-output monitor value Po_ave is lower than the threshold value Po_low, the processing proceeds to step S6. In the other cases, the processing proceeds to step S8.

In step S6, the adjustment unit 12 increases the assumed value Ith_exp of the threshold current value set for the light emitting element by one step. In the subsequent step S7, the adjustment unit 12 increases the threshold value Iop_low by one step. In this regard, the amount of increase in the assumed value Ith_exp of the threshold current value in step S6 is the same as the amount of increase in the threshold value Iop_low in step S7. After the processing of step S7 is completed, the processing returns to step S1.

Figure 6A:
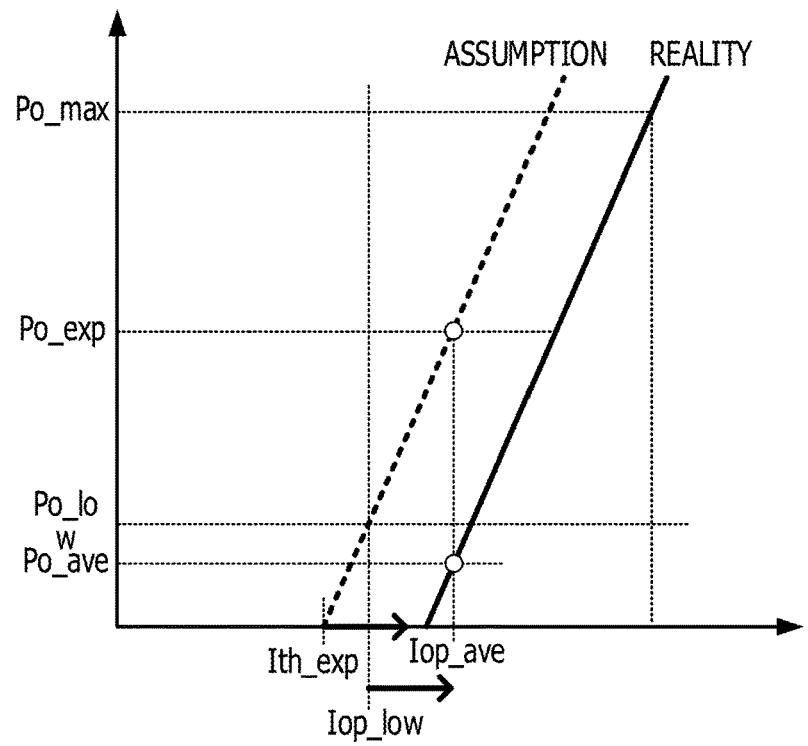
FIG. 6A is a diagram illustrating an example of the contents of the adjustment processing according to the embodiment.

Here, FIG. 6A is a diagram illustrating an example of the contents of the processing of steps S5 to S7. FIG. 6A is a graph illustrating the relationship between the drive current of a light emitting element and optical output. In FIG. 6A, the assumed line is indicated by a broken line when the assumed value Ith_exp of the threshold current value of a light emitting element is set, and the actual line illustrating the actual characteristic of the light emitting element is indicated by a solid line.

The output unit 11 sets the magnitude of the drive current at the time of drawing a first line of an image projected on the screen 200 based on the assumed value Ith_exp of the threshold current value set for the light emitting element. It is assumed that the expected value of the average value of the optical output of the light emitting element at the time of drawing a first line is Po_exp. Po_exp corresponds to the image data VD input to the drive circuit 10. The drive circuit 10 sets the magnitude of the drive current based on the assumed line such that optical output of the light emitting element when the first line is drawn becomes the expected value Po_exp. The average value of the drive current in the drawing period of the first line is calculated by the first calculation unit 13 as the average drive current value Iop_ave.

As illustrated in FIG. 6A, if the actual value of the threshold current value of the light emitting element is higher than the assumed value Ith_exp, the optical output of the light emitting element at the time of driving by Iop_ave becomes significantly lower than the expected value Po_exp. That is to say, the brightness of the image of the first line becomes significantly dark compared with the brightness specified by the image data VD. The average value of the optical output in the drawing period of the first line is calculated by the second calculation unit 14 as the average optical-output monitor value Po_ave.

As illustrated in FIG. 6A, if the average drive current value Iop_ave is higher than the threshold value Iop_low, and the average optical-output monitor value Po_ave is lower than the threshold value Po_low, the adjustment unit 12 shifts the assumed value Ith_exp of the threshold current value in the increasing direction by one step. The adjustment unit 12 also shifts the threshold value Iop_low in the increasing direction by one step.

The output unit 11 sets the magnitude of the drive current at the time of drawing a second line of an image projected on the screen 200 based on the assumed value Ith_exp produced by being shifted one step. The assumed value Ith_exp of the threshold current value, which is newly assumed, is closer to the actual value than the assumed value set at the time of drawing the first line, and thus the deviation of the brightness of the second-line image from the expected value drawn on the screen 200 becomes smaller than that of the first-line image.

In step S8, the adjustment unit 12 determines whether or not the calculated average drive current value Iop_ave is lower than the threshold value Iop_high, and the calculated average optical-output monitor value Po_ave is higher than the threshold value Po_high. The adjustment unit 12 performs the above-described determination for each of the light emitting elements 20R, 20G, and 20B. If the adjustment unit 12 determines that the average drive current value Iop_ave is lower than the threshold value Iop_high, and the average optical-output monitor value Po_ave is higher than the threshold value Po_high, the processing proceeds to step S9. In the other cases, the processing returns to step S1.

In step S9, the adjustment unit 12 decreases the assumed value Ith_exp of the threshold current value set for the light emitting element by one step. In the subsequent step S10, the adjustment unit 12 decreases the threshold value Iop_high by one step. In this regard, the amount of decrease of the assumed value Ith_exp of the threshold current value in step S9 and the amount of decrease of the threshold value Iop_high in step S10 are the same. After the processing of step S10 is completed, the processing returns to step S1.

Figure 6B:
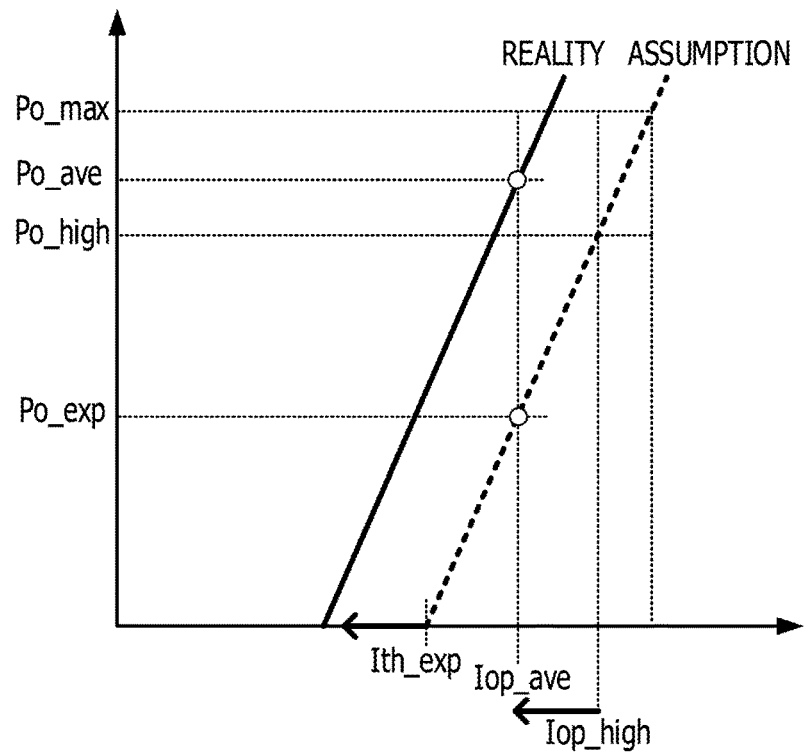
FIG. 6B is a diagram illustrating an example of the contents of the adjustment processing according to the embodiment.

Here, FIG. 6B is a diagram illustrating an example of the contents of the processing in steps S8 to S10. FIG. 6B is a graph illustrating the relationship between the drive current of a light emitting element and optical output. In FIG. 6B, the assumed line is indicated by a broken line when the assumed value Ith_exp of the threshold current value of a light emitting element is set, and the actual line illustrating the actual characteristic of the light emitting element is indicated by a solid line.

The output unit 11 sets the magnitude of the drive current at the time of drawing a first line of an image projected on the screen 200 based on the assumed value Ith_exp of the threshold current value set for the light emitting element. It is assumed that the expected value of the average value of the optical output of the light emitting element at the time of drawing a first line is Po_exp. Po_exp corresponds to the image data input to the drive circuit 10. The drive circuit 10 sets the magnitude of the drive current based on the assumed line such that optical output of the light emitting element when the first line is drawn becomes the expected value Po_exp. The average value of the drive current in the drawing period of the first line is calculated by the first calculation unit 13 as the average drive current value Iop_ave.

As illustrated in FIG. 6B, if the actual value of the threshold current value of the light emitting element is lower than the assumed value Ith_exp, the optical output of the light emitting element at the time of driving by Iop_ave becomes significantly higher than the expected value Po_exp. That is to say, the brightness of the image of the first line becomes significantly bright compared with the brightness specified by the image data VD. The average value of the optical output in the drawing period of the first line is calculated by the second calculation unit 14 as the average optical-output monitor value Po_ave.

As illustrated in FIG. 6B, if the average drive current value Iop_ave is lower than the threshold value Iop_high, and the average optical-output monitor value Po_ave is higher than the threshold value Po_high, the adjustment unit 12 shifts the assumed value Ith_exp of the threshold current value in the decreasing direction by one step. The adjustment unit 12 also shifts the threshold value Iop_low in the decreasing direction by one step.

The output unit 11 sets the magnitude of the drive current at the time of drawing a second line of an image projected on the screen 200 based on the assumed value Ith_exp produced by being shifted one step. The assumed value Ith_exp of the threshold current value, which is newly assumed, is closer to the actual value than the assumed value set at the time of drawing the first line, and thus the deviation of the brightness of the second-line image from the expected value drawn on the screen 200 becomes smaller than that of the first-line image.

Figure 7:
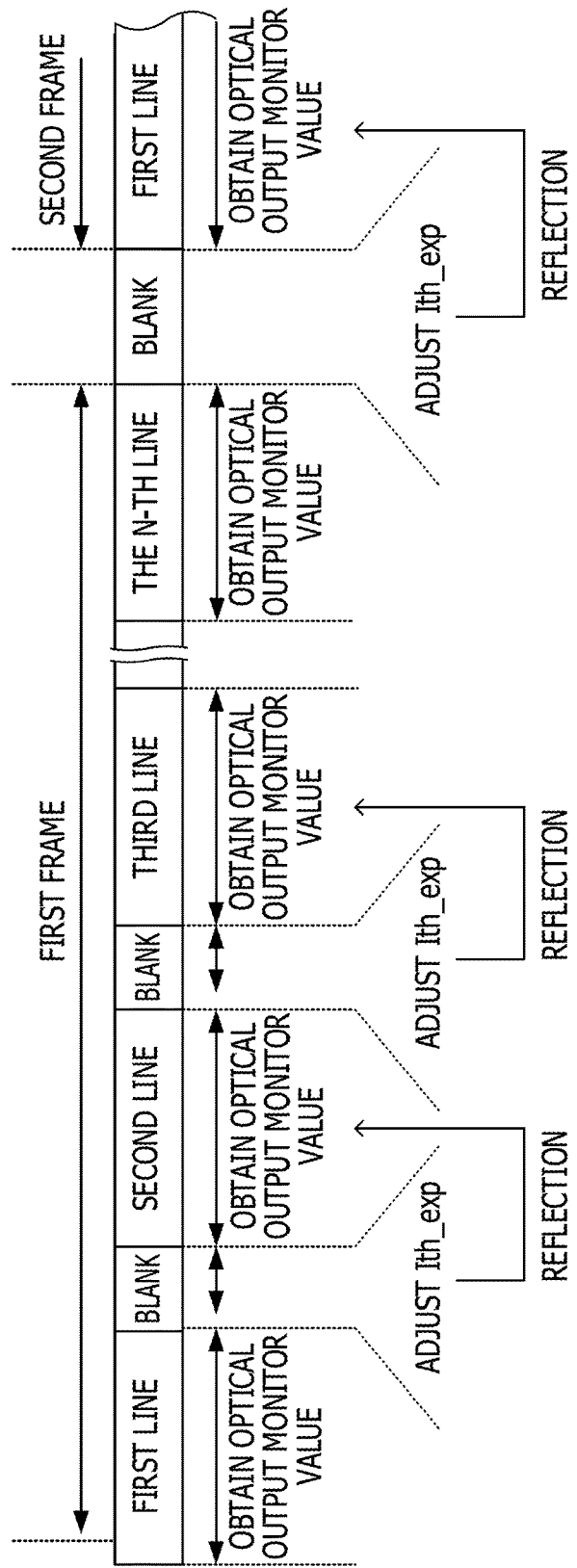
FIG. 7 is a diagram illustrating the timing of the adjustment processing performed by the drive circuit according to the embodiment.

FIG. 7 is a diagram illustrating the timing of the adjustment processing performed by the drive circuit 10. The image projection apparatus 100 draws the images of the first line to the N-th line in sequence so as to form an image of one frame. The drive circuit 10 obtains the optical-output monitor value during a drawing period of each line of the first to the N-th lines included in the image for one frame. The drive circuit 10 calculates the average drive current value Iop_ave and the average optical-output monitor value Po_ave in each blanking period between the drawing period of a certain line and the drawing period of the next line. The drive circuit 10 adjusts the assumed value Ith_exp of the threshold current value of each of the light emitting elements 20R, 20G, and 20B in each blanking period based on the average drive current value Iop_ave and the average optical-output monitor value Po_ave. Based on the assumed value Ith_exp of the threshold current value adjusted in each blanking period, the magnitude of the drive current at the time of drawing the next-line image is set. That is to say, with the drive circuit 10 according to the present embodiment, the adjustment performed based on the optical-output monitor value obtained during a drawing period of each line is reflected on the drawing of the next line.

Figure 8:
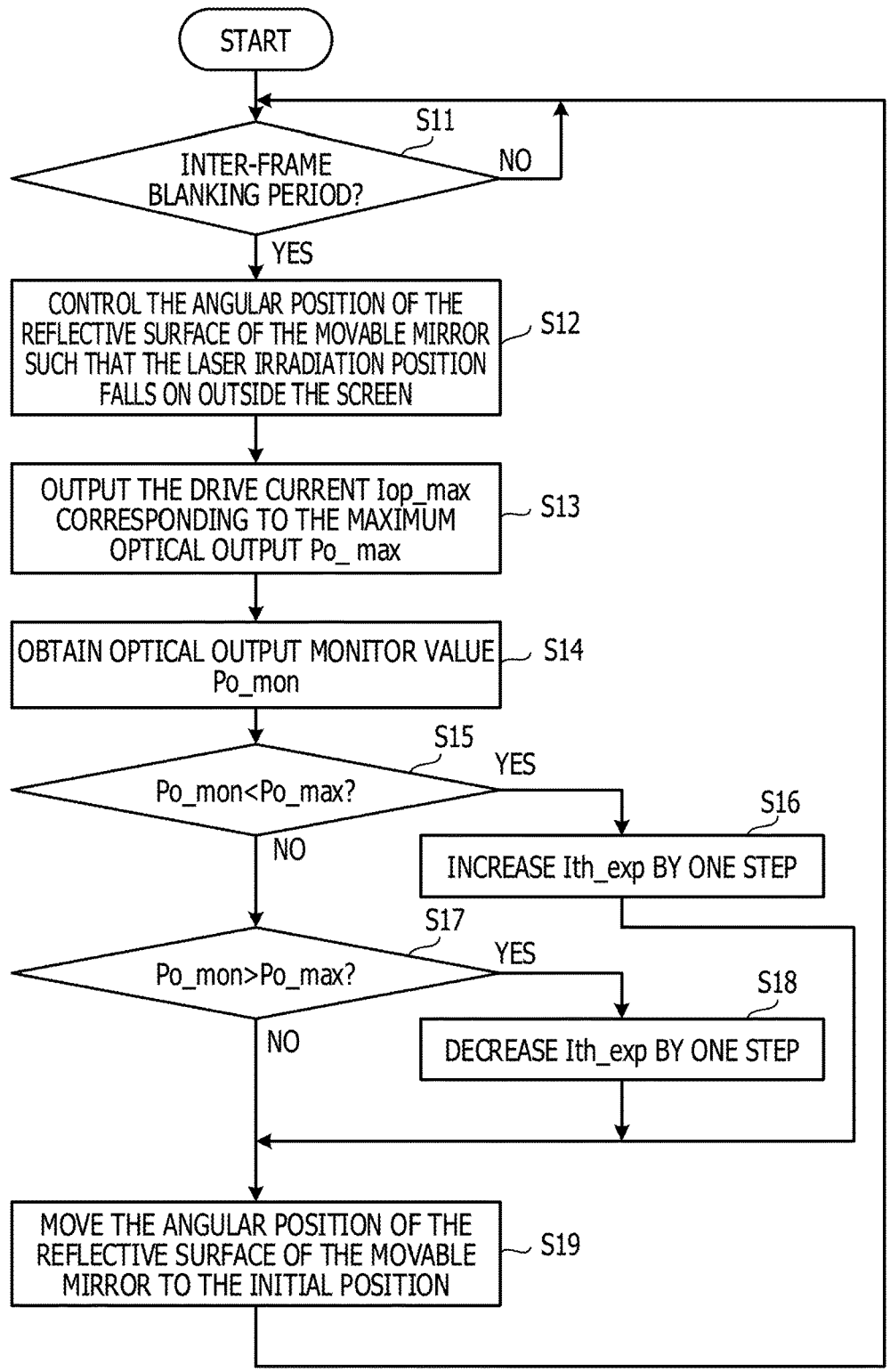
FIG. 8 is a flowchart illustrating a method of adjusting the drive current according to a comparative example.

In the following, a description will be given of an adjustment method of the assumed value Ith_exp of the threshold current value according to a comparative example. FIG. 8 is a flowchart illustrating a method of adjusting the drive current according to the comparative example. The adjustment method of the drive current according to the comparative example is a method of adjusting the drive current in an inter-frame blanking period.

In step S11, a determination is made as to whether the processing has proceeded to an inter-frame blanking period. If determined that the processing has proceeded to an inter-frame blanking period, the processing proceeds to step S12.

In step S12, the angular position of the reflective surface of the movable mirror is controlled such that the irradiation position of the light emitted from the light emitting element is positioned outside the screen.

In step S13, the drive circuit outputs the drive current Iop_max corresponding to the maximum optical output Po_max for each light emitting element.

In step S14, the optical-output monitor value Po_mon is obtained for each light emitting element.

In step S15, a determination is made as to whether or not the optical-output monitor value Po_mon is lower than maximum optical output Po_max for each light emitting element. If determined that the optical-output monitor value Po_mon is lower than the maximum optical output Po_max, the processing proceeds to step S16. In the other cases, the processing proceeds to step S17.

In step S16, the assumed value Ith_exp of the threshold current value, which is assumed for the light emitting element, is increased by one step. After that, the processing proceeds to step S19.

In step S17, a determination is made as to whether or not the optical-output monitor value Po_mon is higher than the maximum optical output Po_max for each light emitting element. If determined that the optical-output monitor value Po_mon is higher than the maximum optical output Po_max, the processing proceeds to step S18.

In step S18, the assumed value Ith_exp of the threshold current value, which is assumed for the light emitting element, is decreased by one step. After that, the processing proceeds to step S19.

In step S19, the angular position of the reflective surface of the movable mirror is moved to the initial position. After that, the processing returns to step S11.

Figure 9:
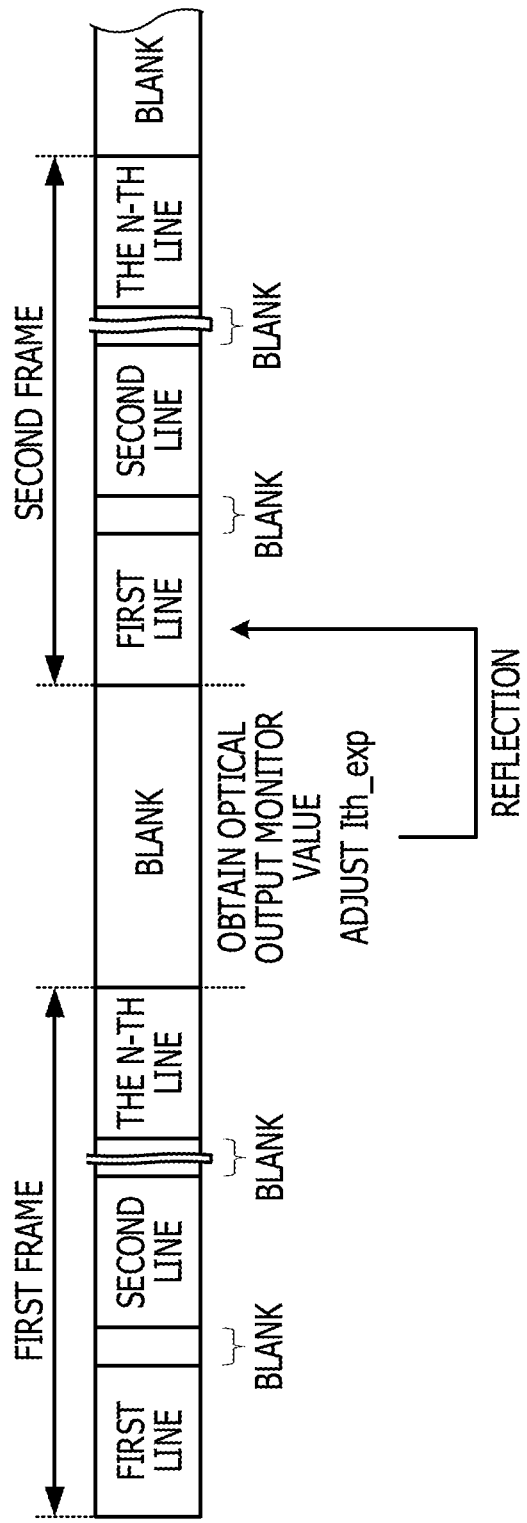
FIG. 9 is a diagram illustrating the timing of the adjustment processing according to the comparative example.

FIG. 9 is a diagram illustrating the timing of the adjustment processing according to the comparative example described above. By the adjustment method according to the comparative example, the drive circuit outputs the drive current Iop_max in each inter-frame blanking period. Thereby, each light emitting element emits light, and the optical-output monitor value Po_mon is obtained. Also, the assumed value Ith of the threshold current value for each light emitting element is adjusted based on the optical-output monitor value Po_mon in an inter-frame blanking period. That is to say, by the adjustment method according to the comparative example, the adjustment of the assumed value Ith_exp of the threshold current value, which is performed based on the optical-output monitor value obtained in an inter-frame blanking period, is reflected on the drawing of the image of the next frame.

By the adjustment method according to the comparative example, the light emitting element is caused to emit light during an inter-frame blanking period in which an image is not displayed on the screen, and the optical-output monitor value Po_mon is obtained. In the above-described example, the angular position of the reflective surface of the movable mirror is controlled so that the irradiation of light emitted from the light emitting element on the screen is avoided.

However, if a further increase of the number of pixels and a further increase in the speed of the frame rate are requested, it is assumed that the movable mirror has to be operated at a further high speed, and the movable range of the movable mirror has to be enlarged to the limit. In this case, it is expected that it becomes difficult to avoid light irradiation on the screen by controlling the angular position of the reflective surface of the movable mirror. Also, by the above-described method, the reflective surface of the movable mirror has to be largely inclined in order to avoid light irradiation on the screen, and thus it takes a long time to process the adjustment of the drive current.

Also, by the above-described method, since the light emitting element is driven during a blanking period in which the light emitting element is originally not driven, the power consumption becomes significantly large. Further, there is a possibility of removing all the inter-frame blanking periods in the future with a request for increasing the frame rate and a request for enlarging the movable range of the movable mirror, and thus it becomes difficult to cope with the situation by the above-described method of performing adjustment in an inter-frame blanking period.

On the other hand, with the drive circuit 10 according to the embodiment, the optical-output monitor value used for adjustment of the assumed value Ith_exp of the threshold current value is obtained from the light emitted from the light emitting element during a drawing period. Accordingly, it is possible to reduce the power consumption due to the adjustment of the assumed value Ith_exp of the threshold current value compared with the method according to the comparative example, by which the light emitting element is driven during a blanking period in which the light emitting element is originally not driven.

Also, with the drive circuit 10 according to the embodiment, the angular position of the reflective surface of the movable mirror has not to be controlled in order to avoid light irradiation on the screen 200. Accordingly, it is possible to cope with a request for increasing the frame rate and a request for enlarging the movable range of the movable mirror.

Also, with the drive circuit 10 according to the embodiment, the assumed value Ith_exp of the threshold current value is adjusted for each one-line drawing period, and thus it is possible to reflect the adjustment result at an earlier stage than the method according to the comparative example, in which adjustment is performed for each one frame period.

In this regard, in the above-described embodiment, a case where the average drive current value Iop_ave and the average optical-output monitor value Po_ave are calculated for each one-line drawing period has been exemplified. However, the technique of the present disclosure is not limited to this mode. For example, the average drive current value Iop_ave and the average optical-output monitor value Po_ave may be calculated for each drawing period of a plurality of lines. In this case, the first calculation unit 13 calculates the average value of the drive currents corresponding to the pixels included in each of the plurality of lines as an average drive current value Iop_ave for each light emitting element. The second calculation unit 14 calculates the average value of the optical-output monitor values obtained for individual pixels included in a plurality of lines for each light emitting element as an average optical-output monitor value Po_ave.

Also, the average drive current value Iop_ave and the average optical-output monitor value Po_ave may be calculated for each frame period. In this case, the first calculation unit 13 calculates the average value of the drive currents corresponding individually to all the pixels included in one frame for each light emitting element as an average drive current value Iop_ave. The second calculation unit 14 calculates the average value of the optical-output monitor values obtained for the individual pixels included in one frame for each light emitting element as an average optical-output monitor value Po_ave.

Second Embodiment

Figure 10:
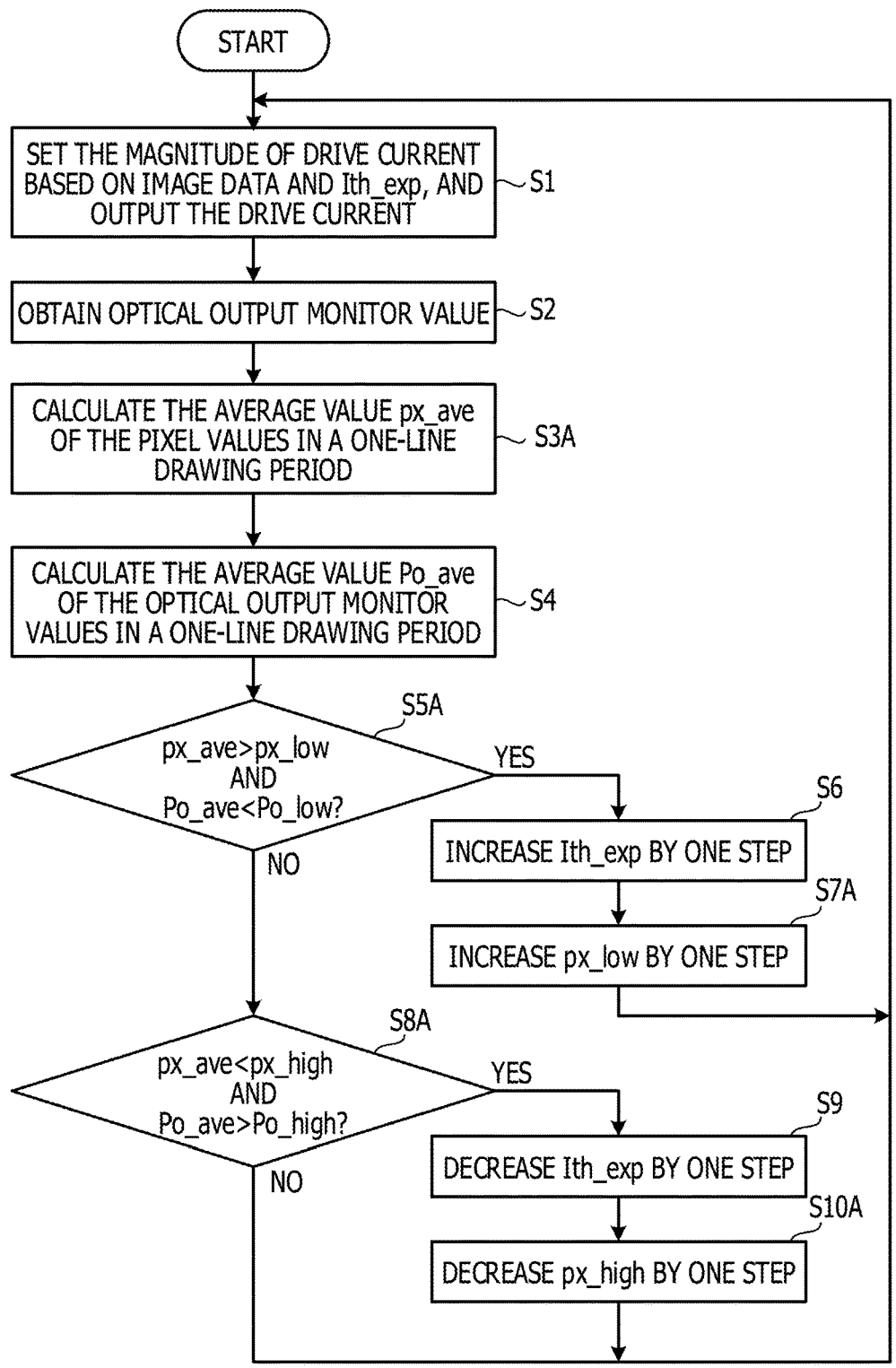
FIG. 10 is a flowchart illustrating a flow of the adjustment processing according to another embodiment.

FIG. 10 is a flowchart illustrating a flow of the adjustment processing according to a second embodiment. In the adjustment processing according to second embodiment, the processing of steps S3, S5, S7, S8, and S10 in the flowchart illustrated in FIG. 5 is replaced with the processing of steps S3A, S5A, S7A, S8A, and S10A respectively. In the following, a description will be given of the processing of S3A, S5A, S7A, S8A, and S10A. The description will be omitted of the processing other than that.

In step S3A, the first calculation unit 13 calculates the average value of the pixel values in a one-line drawing period for each of the light emitting elements 20R, 20G, and 20B as an average pixel value px_ave. That is to say, the first calculation unit 13 calculates the average value of the pixel values of the individual pixels included in an image for one line for each light emitting element as an average pixel value px_ave. In this regard, the pixel values are indicated by the image data DV supplied to the drive circuit 10.

In step S5A, the adjustment unit 12 determines whether or not the calculated average pixel value px_ave is higher than the threshold value px_low, and the calculated average optical-output monitor value Po_ave is lower than the threshold value Po_low. The adjustment unit 12 performs the above-described determination for each of the light emitting elements 20R, 20G, and 20B. If the adjustment unit 12 determines that the average pixel value px_ave is higher than the threshold value px_low, and the average optical-output monitor value Po_ave is lower than the threshold value Po_low, the processing proceeds to step S6. In the other cases, the processing proceeds to step S8A. In step S7A, the adjustment unit 12 increases the threshold value px_low by one step. After the processing of step S7A is completed, the processing returns to step S1.

In step S8A, the adjustment unit 12 determines whether or not the calculated average pixel value px_ave is lower than the threshold value px_high, and the calculated average optical-output monitor value Po_ave is higher than the threshold value Po_high. The adjustment unit 12 performs the above-described determination for each of the light emitting elements 20R, 20G, and 20B. If the adjustment unit 12 determines that the average pixel value px_ave is lower than the threshold value px_high, and the average optical-output monitor value Po_ave is higher than the threshold value Po_high, the processing proceeds to step S9. In the other cases, the processing returns to step S1.

In step S10A, the adjustment unit 12 decreases the threshold value px_high by one step. After the processing of step S10A is completed, the processing returns to step S1.

As described above, with the drive circuit 10 according to the second embodiment, the first calculation unit 13 calculates the average pixel value px_ave for each one-line drawing period in place of calculating the average drive current value Iop_ave for each one-line drawing period. Also, the adjustment unit 12 adjusts the assumed value Ith_exp of the threshold current value of each light emitting element based on the average pixel value px_ave in place of adjusting the assumed value Ith_exp of the threshold current value of each light emitting element based on the average drive current value Iop_ave.

An average pixel value px_ave is a value corresponding to an average drive current value Iop_ave, and thus when the adjustment processing according to the second embodiment is applied, it is possible to obtain the same advantages as those of applying the adjustment processing according to the first embodiment.

Third Embodiment

Figure 11:
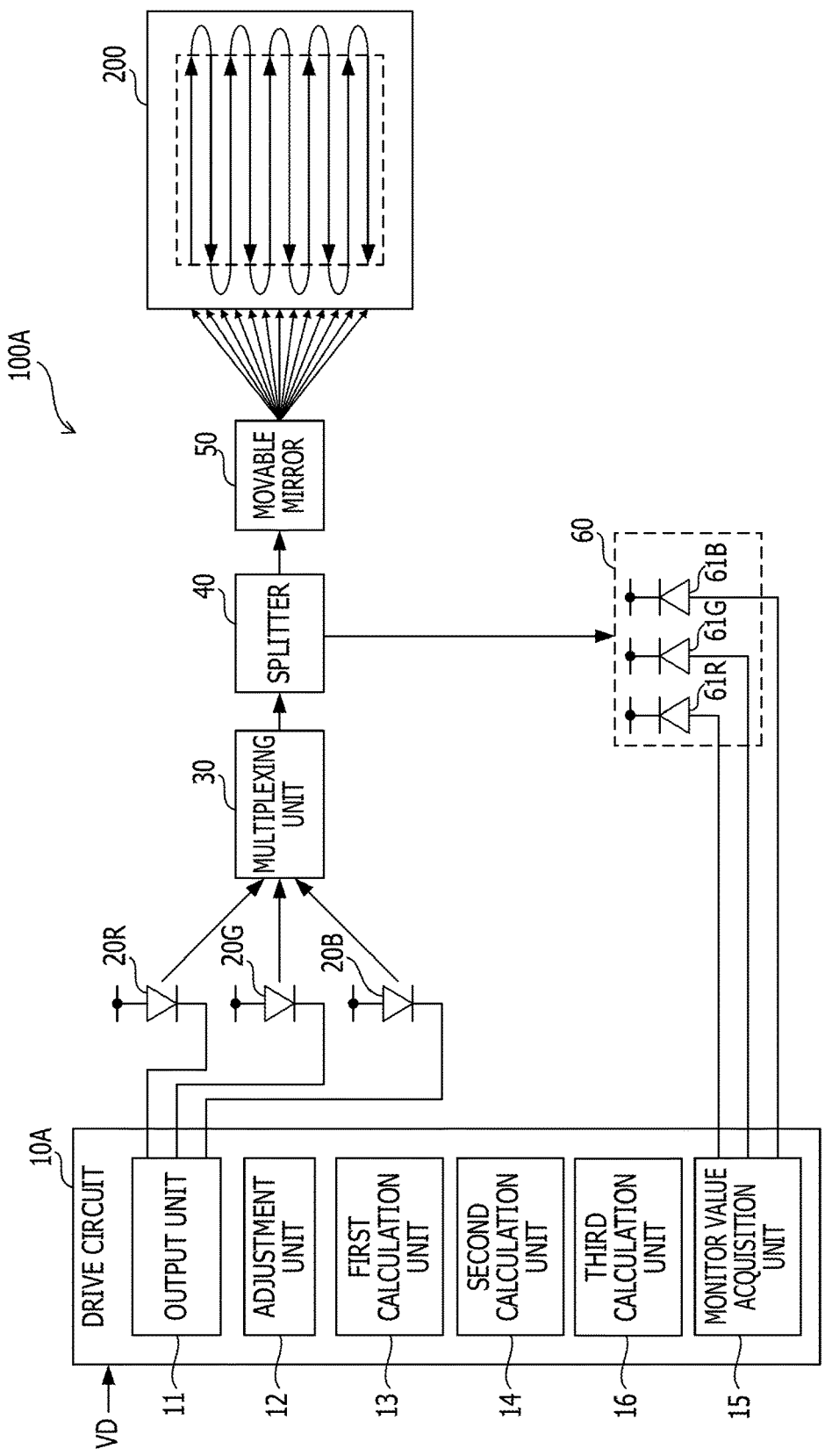
FIG. 11 is a diagram illustrating the configurations of a drive circuit according to another embodiment and an image projection apparatus including the drive circuit.

FIG. 11 is a diagram illustrating the configurations of a drive circuit 10A according to a third embodiment and an image projection apparatus 100A including the drive circuit 10A. The drive circuit 10A according to the third embodiment differs from the drive circuit 10 according to the first embodiment in that the drive circuit 10A further includes a third calculation unit 16.

The third calculation unit 16 calculates the actual value Ith_r of the threshold current values of the light emitting elements 20R, 20G, and 20B based on the average drive current value Iop_ave calculated by the first calculation unit 13 and the average optical-output monitor value Po_ave calculated by the second calculation unit 14. Specifically, the third calculation unit 16 calculates the actual value Ith_r of the threshold current value as follows.

First, the third calculation unit 16 calculates the expected value Po_exp of the optical output for each of the light emitting elements 20R, 20G, and 20B by the following expression (1).

$$Po\_exp = \eta \times (Iop\_ave - Ith\_exp) \quad (1)$$

Here, η is the slope of the drive current-optical output characteristic of the light emitting element. It is assumed that the drive circuit 10A holds the information on the slope η. As illustrated in the expression (1), the third calculation unit 16 calculates the product of the difference between the average drive current value Iop_ave during a one-line drawing period and the assumed value Ith_exp of the threshold current value of the light emitting element, and the slope η as an expected value Po_exp of the optical output of the light emitting element during the one-line drawing period.

Next, the third calculation unit 16 calculates the actual value Ith_r of the threshold current value of the light emitting element for each of the light emitting elements 20R, 20G, and 20B by the following expression (2).

$$Ith\_r = (Po\_exp - Po\_ave)/\eta - Ith\_exp \quad (2)$$

The third calculation unit 16 calculates the difference between a value produced by dividing the difference between the expected value Po_exp of the optical output and the average optical-output monitor value Po_ave in a one-line drawing period by the slope η, and the assumed value Ith_exp of the threshold current value of the light emitting element as the actual value Ith_r of the threshold current value of the light emitting element.

The adjustment unit 12 replaces the assumed value Ith_exp of the threshold current value set for each of the light emitting elements 20R, 20G, and 20B with the actual value Ith_r calculated by the third calculation unit 16. The output unit 11 sets the magnitude of the drive current based on the actual value Ith_r of the threshold current value and outputs the drive current having the set magnitude.

FIG. 12 is a flowchart illustrating a flow of the adjustment processing performed by the drive circuit 10A according to the third embodiment.

In step S21, the output unit 11 sets the magnitude of the drive current and outputs the drive current having the set magnitude for each of the light emitting elements 20R, 20G, and 20B based on the image data VD input from the outside and the assumed value Ith_exp of the threshold current value. Thereby, the light emitting elements 20R, 20G, and 20B emits light having the amount of light (optical output) corresponding to the magnitude of the drive current.

In step S22, the monitor-value acquisition unit 15 outputs a value produced by sampling the optical current output from each of the photodiodes 61R, 61G, and 61B at a predetermined sampling period and converting the sampled value into a digital value as an optical-output monitor value.

In step S23, the first calculation unit 13 calculates the average drive current value Iop_ave in a one-line drawing period for each of the light emitting elements 20R, 20G, and 20B. That is to say, the first calculation unit 13 calculates the average value of the drive currents corresponding to the individual pixels included in an image for one line for each light emitting element as an average drive current value Iop_ave.

In step S24, the second calculation unit 14 calculates the average value of the optical-output monitor values in a one-line drawing period out of the optical-output monitor values output from the monitor-value acquisition unit 15 for each of the light emitting elements 20R, 20G, and 20B as an average optical-output monitor value Po_ave.

In step S25, the third calculation unit 16 calculates the expected value Po_exp of the optical output by assigning the calculated average drive current value Iop_ave to the expression (1) for each of the light emitting elements 20R, 20G, and 20B.

In step S26, the third calculation unit 16 calculates the actual value Ith_r of the threshold current value by assigning the calculated average optical-output monitor value Po_ave and the expected value Po_exp of the optical output to the expression (2) for each of the light emitting elements 20R, 20G, and 20B.

In step S27, the adjustment unit 12 replaces the assumed value Ith_exp of the threshold current value with the actual value Ith_r for each of the light emitting elements 20R, 20G, and 20B. The output unit 11 sets the magnitude of the drive current supplied to each light emitting element at the time of drawing the next line based on the actual value Ith_r of the threshold current value.

With the drive circuit 10A according to third embodiment, the actual value Ith_r of the threshold current value for each of the light emitting elements 20R, 20G, and 20B is calculated, and thus it is possible to completely remove deviation from the expected value of the optical output. Also, in the drive circuit 10 according to the first embodiment, the assumed value Ith_exp of the threshold current value is brought closer to the actual value one step at a time. In contrast, in the drive circuit 10A according to the third embodiment, the assumed value Ith_exp of the threshold current value is replaced with the actual value Ith_r at once.

In this regard, the drive circuits 10 and 10A are examples of the drive circuit in the disclosed technique. The output unit 11 is an example of the output section in the disclosed technique. The adjustment unit 12 is an example of the adjustment section in the disclosed technique. The first calculation unit 13 is an example of the first calculation section in the disclosed technique. The second calculation unit 14 is an example of the second calculation section in the disclosed technique. The monitor-value acquisition unit 15 is an example of the acquisition section in the disclosed technique. The third calculation unit 1615 is an example of the third calculation section in the disclosed technique. The light emitting elements 20R, 20G, and 20B are examples of the light emitting elements in the disclosed technique. The movable mirror 50 is an example of the optical system and the movable mirror in the disclosed technique. The image projection apparatuses 100 and 100A are examples of the image projection apparatus in the disclosed technique. The assumed value Ith_exp of the threshold current value is an example of the assumed value of the threshold current value in the disclosed technique. The actual value Ith_r of the threshold current value is an example of the actual value of the threshold current value in the disclosed technique. The threshold value Iop_low is an example of the first drive-current threshold value according to the disclosed technique. The threshold value Iop_high is an example of the second drive-current threshold value according to the disclosed technique. The threshold value Po_low is an example of the first optical-output threshold value according to the disclosed technique. The threshold value Po_high is an example of the second optical-output threshold value.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A drive circuit for supplying a drive current to light emitting elements, the drive circuit comprising:
    an output circuit that sets a magnitude of the drive current based on an assumed value of a threshold current being a threshold value of the drive current;
    an acquisition circuit that acquires an optical-output monitor value indicating a magnitude of an optical output of the light emitting elements;
    a first calculation circuit that calculates an average value of the drive current in a predetermined period in a frame period when an image for one frame is drawn as an average drive current value for each of the predetermined period;
a second calculation circuit that calculates an average value of the optical-output monitor values in the predetermined period as an average optical-output monitor value; and
an adjustment circuit that adjusts the assumed value of the threshold current value based on the average drive current value and the average optical-output monitor value,
when the average drive current value is higher than a first drive-current threshold value, and the average optical-output monitor value is lower than a first optical-output threshold value, the adjustment circuit increases the assumed value of the threshold current value.

2. The drive circuit according to claim 1, wherein when the average drive current value is lower than a second drive-current threshold value being higher than the first drive-current threshold value, and the average optical-output monitor value is higher than a second optical-output threshold value being higher than the first optical-output threshold value, the adjustment circuit decreases the assumed value of the threshold current value.

3. The drive circuit according to claim 1, wherein
the first calculation circuit calculates the average drive current value for each one-line drawing period being a drawing period of each of a plurality of lines constituting the image for one frame, and
the second calculation circuit calculates the average optical-output monitor value for each of the one-line drawing period.

4. The drive circuit according to claim 1, wherein
the first calculation circuit calculates the average drive current value for each drawing period of an image for a plurality of lines, and
the second calculation circuit calculates the average optical-output monitor value for each drawing period of the image for the plurality of lines.

5. The drive circuit according to claim 1, wherein
the first calculation circuit calculates the average drive current value for each of the frame period, and
the second calculation circuit calculates the average optical-output monitor value for each of the frame period.

6. The drive circuit according to claim 1,
wherein the first calculation circuit calculates an average value of pixel values corresponding to the drive current as an average pixel value in place of calculating the average drive current value, and
the adjustment circuit adjusts the assumed value of the threshold current value based on the average pixel value in place of the average drive current value.

7. A drive circuit for supplying a drive current to light emitting elements, the drive circuit comprising:
an output circuit that sets a magnitude of the drive current based on an assumed value of a threshold current being a threshold value of the drive current;
an acquisition circuit that acquires an optical-output monitor value indicating a magnitude of an optical output of the light emitting elements during a drawing period of the image;
a first calculation circuit that calculates an average value of the drive current in a predetermined period in a frame period when an image for one frame is drawn as an average drive current value for each of the predetermined period;
a second calculation circuit that calculates an average value of the optical-output monitor values in the predetermined period as an average optical-output monitor value;
a third calculation circuit that calculates optical outputs of the light emitting elements corresponding to the average drive current values as optical output expected values and calculates actual values of the threshold current values based on the average optical-output monitor values and the optical output expected values; and
an adjustment circuit that replaces the assumed value of the threshold current value with the actual value.

8. An image projection apparatus comprising:
light emitting elements;
an optical system that shifts irradiation positions of light emitted from the light emitting elements in sequence on a display screen so as to draw each frame of an image including a plurality of frames on the display screen in sequence; and
a drive circuit that supplies drive currents to the light emitting elements,
wherein the drive circuit includes
an output circuit that sets a magnitude of the drive current based on an assumed value of a threshold current being a threshold value of the drive current for the light emitting elements to start light emission,
an acquisition circuit that acquires an optical-output monitor value indicating a magnitude of an optical output of the light emitting elements during a drawing period of the image,
a first calculation circuit that calculates an average value of the drive current in a predetermined period in a frame period when an image for one frame is drawn as an average drive current value for each of the predetermined period,
a second calculation circuit that calculates an average value of the optical-output monitor values in the predetermined period as an average optical-output monitor value, and
an adjustment circuit that adjusts the assumed value of the threshold current value based on the average drive current value and the average optical-output monitor value.

9. The image projection apparatus according to claim 8, wherein when the average drive current value is higher than a first drive-current threshold value, and the average optical-output monitor value is lower than a first optical-output threshold value, the adjustment circuit increases the assumed value of the threshold current value.

10. The image projection apparatus according to claim 8, wherein when the average drive current value is lower than a second drive-current threshold value being higher than the first drive-current threshold value, and the average optical-output monitor value is higher than a second optical-output threshold value being higher than the first optical-output threshold value, the adjustment circuit decreases the assumed value of the threshold current value.

11. The image projection apparatus according to claim 8, wherein
the first calculation circuit calculates the average drive current value for each one-line drawing period being a drawing period of each of a plurality of lines constituting the image for one frame, and
the second calculation circuit calculates the average optical-output monitor value for each of the one-line drawing period.

12. The image projection apparatus according to claim 8, wherein
    the first calculation circuit calculates the average drive current value for each drawing period of an image for a plurality of lines, and
    the second calculation circuit calculates the average optical-output monitor value for each drawing period of the image for the plurality of lines.

13. The image projection apparatus according to claim 8, wherein
    the first calculation circuit calculates the average drive current value for each of the frame period, and
    the second calculation circuit calculates the average optical-output monitor value for each of the frame period.

14. The image projection apparatus according to claim 8, wherein
    the first calculation circuit calculates an average value of pixel values corresponding to the drive current as an average pixel value in place of calculating the average drive current value, and
    the adjustment circuit adjusts the assumed value of the threshold current value based on the average pixel value in place of the average drive current value.

15. The image projection apparatus according to claim 8, wherein the optical system includes a movable mirror that has a reflective surface reflecting light emitted from the light emitting elements, and that changes an angular position of the reflective surface so as to shift irradiation positions on the display screen of the light reflected by the reflective surface along a drawing line in sequence to draw an image for one line on the display screen, and to shift the image for one line in a direction crossing a direction of the drawing line in sequence in order to draw the image for one frame on the display screen.

16. The image projection apparatus according to claim 8, wherein the light emitting elements are laser diodes.

17. The image projection apparatus according to claim 8, wherein a plurality of laser diodes having different emission colors with each other are included as the light emitting elements.

\* \* \* \* \*